US007934164B2

(12) United States Patent
Fukuoka

(10) Patent No.: US 7,934,164 B2
(45) Date of Patent: Apr. 26, 2011

(54) INFORMATION PROCESSING APPARATUS AND CONTROL METHOD THEREOF, AND PROGRAM

(75) Inventor: Fumihiro Fukuoka, Yokohama (JP)

(73) Assignee: Canon Kabushiki Kaisha (JP)

( * ) Notice: Subject to any disclaimer, the term of this patent is extended or adjusted under 35 U.S.C. 154(b) by 741 days.

(21) Appl. No.: 11/953,561

(22) Filed: Dec. 10, 2007

(65) Prior Publication Data

US 2008/0141176 A1 Jun. 12, 2008

(30) Foreign Application Priority Data

Dec. 12, 2006 (JP) ................................. 2006-335077
Nov. 16, 2007 (JP) ................................. 2007-298598

(51) Int. Cl.
*G06F 3/048* (2006.01)

(52) U.S. Cl. ........................................ 715/764; 715/856

(58) Field of Classification Search .................. 715/764, 715/856

See application file for complete search history.

(56) References Cited

U.S. PATENT DOCUMENTS

| 5,986,657 | A   | * | 11/1999 | Berteig et al. ................. 715/792 |
| 6,636,250 | B1  |   | 10/2003 | Gasser |
| 6,670,973 | B1  | * | 12/2003 | Hill et al. ....................... 715/853 |
| 6,765,597 | B2  | * | 7/2004  | Barksdale et al. ............. 715/853 |
| 6,961,909 | B2  | * | 11/2005 | Lord et al. ...................... 715/853 |
| 7,614,616 | B2  | * | 11/2009 | Bauman et al. ................. 267/120 |
| 7,769,794 | B2  | * | 8/2010  | Moore et al. .................... 707/831 |
| 7,788,599 | B2  | * | 8/2010  | Michaud et al. ............... 715/810 |
| 2005/0076312 | A1 | * | 4/2005 | Gardner et al. ................ 715/853 |
| 2010/0110843 | A1 | * | 5/2010 | Kamei et al. ...................... 369/1 |

FOREIGN PATENT DOCUMENTS

JP 2005-242944 A 9/2005

OTHER PUBLICATIONS

Chinese Office Action issued on Apr. 10, 2009 in correspondinng Chinese Patent Application No. 200710196848.6.
Hong Xu, Introduction and Instance Tutorials of Windows XP in Chinese, pp. 40-43, Sep. 30, 2005. Cited in CN OA issued in corres. CN Patent Appln. No. 200710196848.6 dated Apr. 10, 2009; see NPL cite No. 1.
Dafeng, Windows 98 Basic Operation, Health-Care for the Middle-Aged, Issue 5, 2001, p. 47, May 31, 2001.Cited in CN OA issued in corres. CN Patent Appln. No. 200710196848.6 dated Apr. 10, 2009; see NPL cite No. 1.

* cited by examiner

*Primary Examiner* — William L Bashore
*Assistant Examiner* — David Phantana-angkool
(74) *Attorney, Agent, or Firm* — Rossi, Kimms & McDowell LLP

(57) ABSTRACT

The number of folders to be displayed required to restrict and display folders on a lower hierarchy of a folder expanded by the folder opening and closing module is determined based on the number of folders included in the lower hierarchy to be expanded, and the height of the window. The folders included in the lower hierarchy are displayed to have the determined number of folders to be displayed.

10 Claims, 7 Drawing Sheets

INFORMATION PROCESSING APPARATUS AND CONTROL METHOD THEREOF, AND PROGRAM

BACKGROUND OF THE INVENTION

1. Field of the Invention

The present invention relates to an information processing apparatus which executes display control of a folder group using a hierarchical structure, a control method thereof, and a program.

2. Description of the Related Art

In order to express the structure of folders (directories) on an operation system using a GUI (Graphical User Interface), it is a common practice to display folder configurations having a parent-child relationship using a tree format.

A window system such as Microsoft Windows™ or the like also displays the hierarchical structure of folders on the left part of a window, and displays elements (folders and files) under a folder arbitrarily selected from the hierarchical structure.

In order to open a folder on a lower hierarchy, the user clicks a folder name or an icon which is allocated beside the folder name and is used to open/close the folder to display folders immediately under that folder.

In the display method of the folder hierarchical structure of such tree structure, when one hierarchy includes a very large number of subfolders, all of these subfolders cannot be displayed on the display region of a window. In this case, the user cannot recognize the whole folder hierarchical structure unless he or she operates a scroll bar displayed on the window.

Also, it is a common practice to copy or move a file displayed on the right part of a window by dragging and dropping that file into another folder. However, while a large number of folders are displayed on the left tree part of the window, the copy/move operability is poor.

A technique which improves the operability by displaying only a part of this folder hierarchical structure, and making a scroll operation using up, down, right, and left scroll buttons is available (for example, Japanese Patent Laid-Open No. 2005-242944).

Japanese Patent Laid-Open No. 2005-242944 described above allows the user to scroll the display contents at once using a hierarchy jump button and list jump button. However, since only some hierarchies are displayed, it is difficult for the user to recognize the whole folder hierarchies. In particular, if there are a large number of folders on a lower hierarchy, the user can hardly recognize the configurations of folders on an upper hierarchy, thus impairing the operability.

As described in U.S. Pat. No. 6,636,250, upon selection of the "Name" relationship function in FIG. 7, a sub-list 350 of icons is condensed using arrangement icons 210-15 to 210-18, as shown in FIG. 8. When one of these arrangement icons is expanded, it is displayed like a sub-list 360 in FIG. 8. With this U.S. Pat. No. 6,636,250, the number of arrangement icons and the number of icons which belong to each arrangement icon are determined by computing the square root of the number of icons of the sub-list 350. For example, when there are 52 icons, they are condensed using seven series arrangement icons and one additional series arrangement icon.

In this way, U.S. Pat. No. 6,636,250 determines the number of arrangement icons by computing the square root of the number of icons, but does not consider the size of a window that displays the icons.

SUMMARY OF THE INVENTION

The present invention has been made to solve the aforementioned problems. The object of the present invention is to provide an information processing apparatus which generates a flexible folder hierarchical structure in accordance with the window size and the number of folders to be displayed upon operation within the folder hierarchical structure, a control method thereof, and a program.

According to one aspect of the present invention, an information processing apparatus which performs display control of a plurality of folders using a hierarchical structure, comprises:

folder opening means for opening one of folder included in the hierarchical structure displayed on a display screen;

determining means for determining the number of folders to be displayed on a lower hierarchy of the folder opened by the folder opening means, based on the number of the currently displayed folders on the display screen, the number of folders included in the lower hierarchy of the folder opened by the folder opening means, and a height of a window on which the plurality of folders are displayed; and hierarchical display means for displaying the folders on the lower hierarchy in accordance with the number of folders to be displayed determined by the determining means.

According to another aspect of the present invention, a method of controlling an information processing apparatus which performs display control of a plurality of folders using a hierarchical structure, the method comprises:

a folder opening step of opening one of folder included in the hierarchical structure displayed on a display screen;

a determining step of determining the number of folders to be displayed on a lower hierarchy of the folder opened in the folder opening step, based on the number of the currently displayed folders on the display screen, the number of folders included in the lower hierarchy of the folder opened in the folder opening step, and a height of a window on which the plurality of folders are displayed; and a hierarchical display step of displaying the folders on the lower hierarchy in accordance with the number of folders to be displayed determined in the determining step.

According to still another aspect of the present invention, a program stored in a computer-readable medium to make a computer execute control of an information processing apparatus which performs display control of a plurality of folders using a hierarchical structure, the program makes the computer execute:

a folder opening step of opening one of folder included in the hierarchical structure displayed on a display screen;

a determining step of determining the number of folders to be displayed on a lower hierarchy of the folder opened in the folder opening step, based on the number of the currently displayed folders on the display screen, the number of folders included in the lower hierarchy of the folder opened in the folder opening step, and a height of a window on which the plurality of folders are displayed; and a hierarchical display step of displaying the folders on the lower hierarchy in accordance with the number of folders to be displayed determined in the determining step.

Further features of the present invention will become apparent from the following description of exemplary embodiments with reference to the attached drawings.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
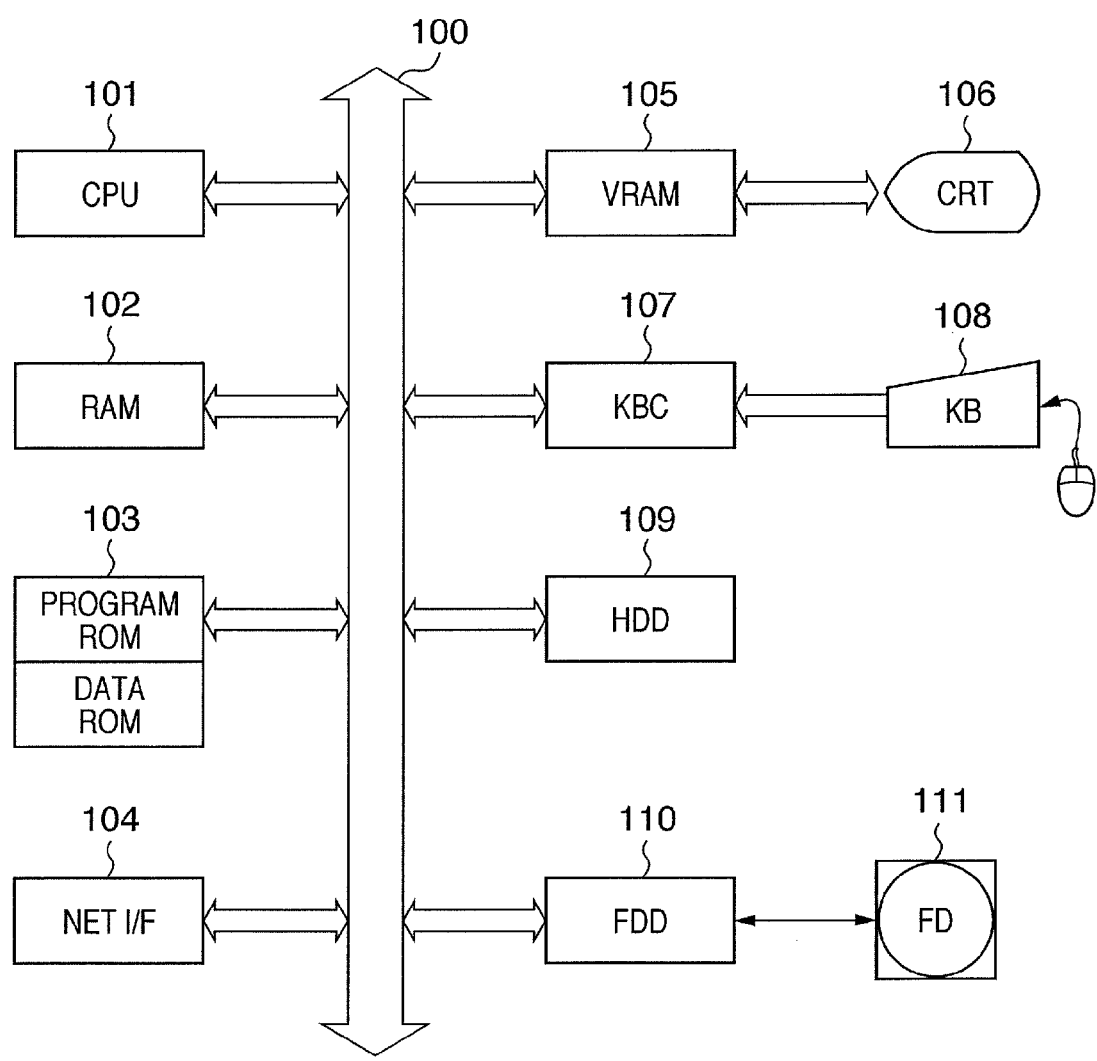
FIG. 1 is a block diagram showing an example of the arrangement of an information processing apparatus according to the first embodiment of the present invention.

FIG. 1 is a block diagram showing an example of the arrangement of an information processing apparatus according to the first embodiment of the present invention.

Referring to FIG. 1, reference numeral 101 denotes a central processing unit (to be referred to as a CPU hereinafter) which executes arithmetic and control operations of the information processing apparatus. Reference numeral 102 denotes a random-access memory (to be referred to as a RAM hereinafter), which serves as a main memory of the CPU 101, and also as an area for an execution program, and an execution area and data area of that program.

Reference numeral 103 denotes a read-only memory (to be referred to as a ROM hereinafter) which stores programs that implement the operation processing sequences of the CPU 101. The ROM 103 includes a program ROM which records basic software (OS) as a system program for attaining device control of the information processing apparatus, and a data ROM which records data such as information required for operations of the system and the like. In place of the ROM 103, an HDD 109 to be described later may often be used.

Reference numeral 104 denotes a network interface (NET I/F) which performs control required to make data transfer between information processing apparatuses via a network, and diagnoses the connection state. Reference numeral 105 denotes a video RAM (VRAM), which renders an image to be displayed on the screen of a CRT 106 so as to indicate the operation state, and executes its display control.

Reference numeral 106 denotes a display device (to be referred to as a CRT hereinafter) such as a display or the like. Reference numeral 107 denotes a controller (to be referred to as a KBC hereinafter) which controls an input signal from an external input device 108. Reference numeral 108 denotes an external input device (to be referred to as a KB hereinafter) which accepts operations made by the user, and comprises, for example, a keyboard and a pointing device such as a mouse or the like.

Reference numeral 109 denotes a hard disk drive (to be referred to as an HDD hereinafter), which is used to save application programs and various data. The application programs in the first embodiment include software programs that implement various processors in the first embodiment and the like.

Reference numeral 110 denotes an external input/output device (to be referred to as an FOD hereinafter) such as, for example, a Floppy® disk drive/CD-ROM drive, or the like, which inputs/outputs data on a removable disk, and is used to read out the aforementioned application programs from medium.

Reference numeral 111 denotes a detachable data recording medium (removable medium) (to be referred to as an FD hereinafter). This FD 111 includes, for example, a magnetic recording medium (e.g., a Floppy® disk or an external hard disk) read out by the FDD 110. Also, the FD 111 includes, for example, an optical recording medium (e.g., a CD-ROM), magneto-optical recording medium (e.g., an MO), semiconductor recording medium (e.g., a memory card), and the like.

Note that the application programs and data stored in the HDD 109 may be stored and used in the FD 111.

The functional arrangement of a folder hierarchical structure generation apparatus implemented by the information processing apparatus of the first embodiment will be described below with reference to FIG. 2.

Figure 2:
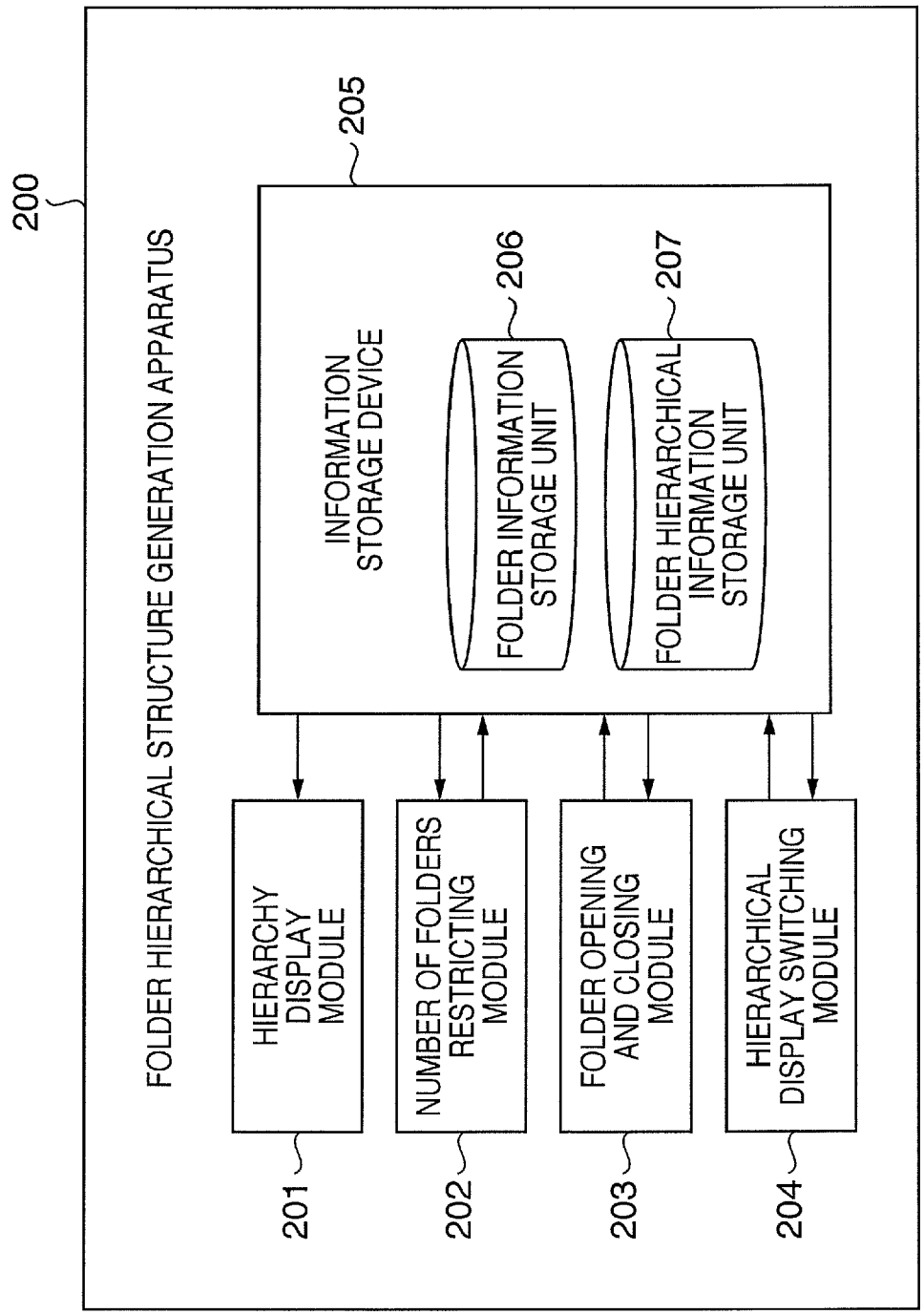
FIG. 2 is a block diagram showing the functional arrangement of a folder hierarchical structure generation apparatus according to the first embodiment of the present invention.

FIG. 2 is a block diagram showing the functional arrangement of a folder hierarchical structure generation apparatus according to the first embodiment of the present invention.

A folder hierarchical structure generation apparatus 200 shown in FIG. 2 comprises processing modules 201 to 204 which run inside the apparatus, and an information storage device 205 which stores information. The information storage device 205 has a folder information storage unit 206 and folder hierarchical information storage unit 207 as a data storage unit group.

Referring to FIG. 2, reference numerals 201, 202, 203, and 204 denote processing modules. These processing modules are loaded from the ROM 103, HDD 109, or FDD 110 shown in FIG. 2 and are mapped on the RAM 102 to serve as application programs or some components of programs used by the CPU 101.

Referring to FIG. 2, reference numeral 205 denotes an information storage device, which stores information using the HDD 109 in the folder hierarchical structure generation apparatus 200 using a file system or database system. Specific information stored in the information storage device 205 can be directly accessed using a specific key or conditions.

The folder information storage unit 206 stores information of folders (folder information) used in the first embodiment. The folder hierarchical information storage unit 207 stores information (folder hierarchical information) associated with the parent-child relationship (hierarchy) of folders used in the first embodiment.

Assume that data such as folder information, folder hierarchical information, and the like used in the first embodiment are registered in advance in the folder information storage unit 206 and folder hierarchical information storage unit 207.

Arrows shown in FIG. 2 mean principal ones of control between the processing modules 201 to 204 and the information storage device 205 and the flows of information. As for the relationship between the folder hierarchical structure generation apparatus 200, and the processing modules 201 to 204 and information storage device 205, information and instructions input by the user using the KB 108 are deployed to the RAM 102 via the KBC 107 as needed and are transmitted to the CPU 101.

The CPU 101 makes arithmetic operations, and stores information of the arithmetic operation results in the information storage device 205 which stores the required processing module and information, and is assured on the ROM 103, HDD 109, FDD 110, RAM 102, or the like. At the same time, the arithmetic operation results of the CPU 101 are displayed on the CRT 106 via the VRAM 105.

The CPU 101, RAM 102, ROM 103, NET I/F 104, VRAM 105, KBC 107, HDD 109, and FDD 110 exchange information via a transmission bus 100.

Referring to FIG. 2, upon input of an instruction to generate and display the folder hierarchical structure by an operator's operation, the hierarchy display module 201 acquires required folder information and folder hierarchical information from the folder information storage unit 206 and folder hierarchical information storage unit 207.

Furthermore, upon input of an instruction to change the display contents of the displayed folder hierarchical structure by an operator's operation, the folder opening and closing module 203, the number of folder restricting module 202, and the hierarchical display switching module 204 execute processes in collaboration with the hierarchy display module 201. More specifically, these modules acquire information of a folder from the folder information storage unit 206 and folder hierarchical information storage unit 207, and execute an update process of required data. Then, the display process of the folder hierarchical structure is executed, and that result is displayed on the CRT 106.

The folder hierarchical structure generation method of the first embodiment will be described below with reference to FIG. 3.

Figure 3:
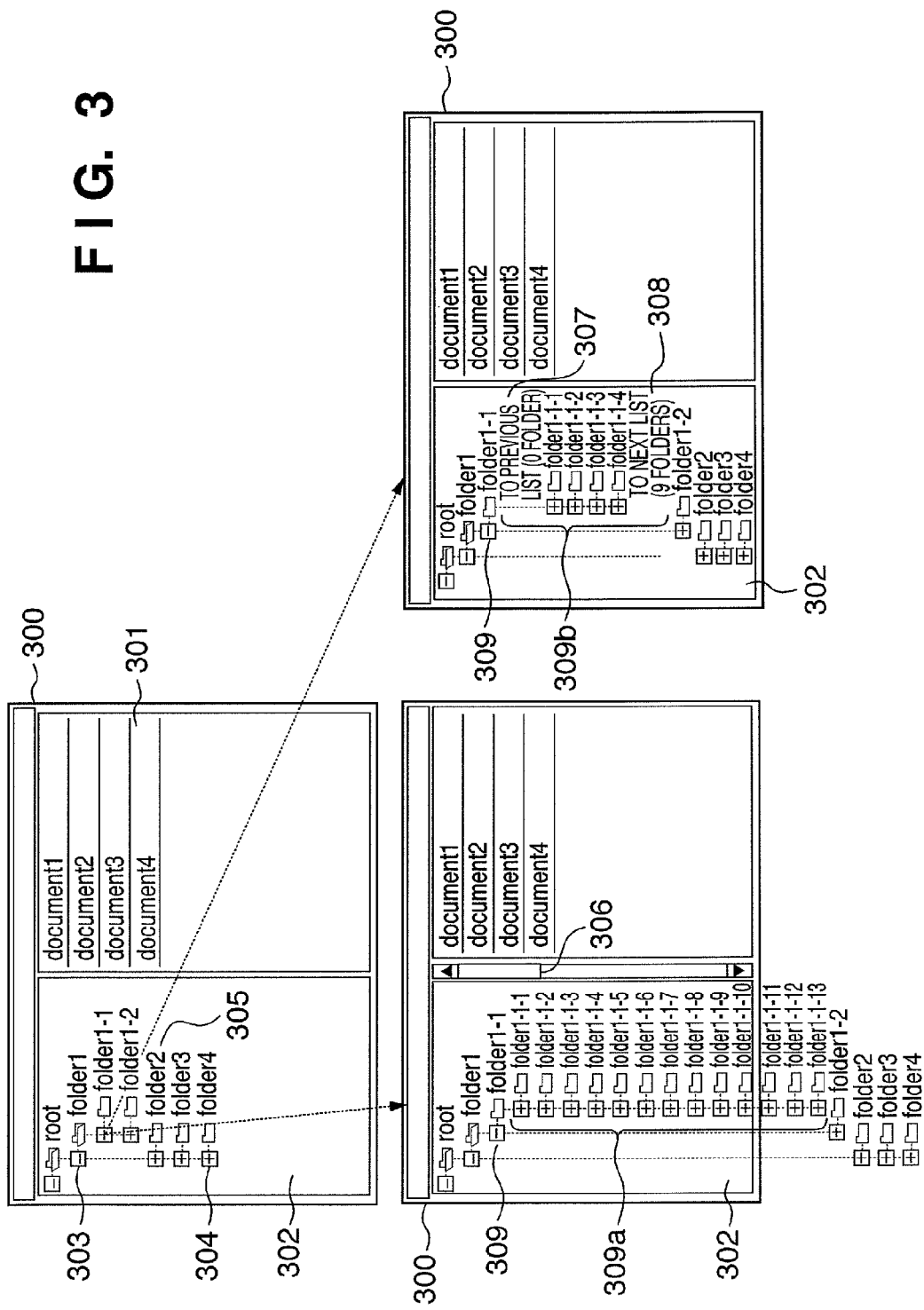
FIG. 3 is a view for explaining a folder hierarchical structure generation method according to the first embodiment of the present invention.

FIG. 3 is a view for explaining the folder hierarchical structure generation method according to the first embodiment of the present invention.

An upper window 300 in FIG. 3 is configured by a hierarchical structure display area 302 which displays folders in a tree structure as the left part of the window 300, and a folder element display area 301 which displays folder elements (folders, files, and the like) included in a selected folder as the right part of the window 300. In a general window system or document management system, such window also includes menus and buttons that allow the operator to make operations for displayed folders and files. However, such menus and buttons are not directly related to the present invention, and a description will not be given.

The hierarchical structure display area 302 includes folder opening and closing buttons 304 and 303 used to open close each folder having a lower hierarchy, and folders 305. The folder element display area 301 includes a list of subfolders and files in the selected folder.

The window 300 may be a display screen whose size can be changed by a user's operation or which has a fixed display size.

The hierarchical structure display area 302 and folder element display area 301 comprise a scroll bar 306 which is displayed as needed when the number of data to be displayed exceeds the display area.

Note that a lower left window 300 in FIG. 3 is a display example of a general folder hierarchical structure.

Upon pressing a folder opening button 309 of a folder "folder1-1" in the state of the upper window 300 in FIG. 3, a hierarchical structure 309*a* using all pieces of information of subfolders of the folder "folder1-1" is generated, and is displayed on the hierarchical structure display area 302, as shown in a lower right window 300 in FIG. 3. There are 13 subfolders of the folder "folder1-1", and subfolders "folder1-1-1" to "folder1-1-13" are displayed, as shown in FIG. 3.

Note that the lower left window 300 in FIG. 3 displays the subfolders "folder1-1-1" to "folder1-1-13" and folders "folder2" to "folder4" for the sake of convenience. However, these subfolders and folders exist outside the display region of the window 300 in practice, and are not displayed in the state of the lower left window 300 in FIG. 3. Therefore, the lower left window 300 in FIG. 3 displays the scroll bar 306 used to scroll the non-displayed subfolders and folders into the hierarchical structure display area 302.

By contrast, the lower right window 300 in FIG. 3 is a display example of the folder hierarchical structure generated by the folder hierarchical structure generation method of the first embodiment.

Upon pressing the folder opening button 309 of the folder "folder1-1" on the lower right window 300 in FIG. 3 in the state of the upper window 300 of FIG. 3, the number of subfolders to be displayed is restricted so that the subfolders can fall within the height of the window 300 as much as possible, in place of generating the folder hierarchical structure using all subfolders. In this case, the subfolders "folder1-1-1" to "folder1-1-4" of the subfolders "folder1-1-1" to "folder1-1-13" of the folder "folder1-1" are displayed. Display of the remaining subfolders "folder1-1-5" to "folder1-1-13" is restricted. That is the size of the subfolder display region is restricted to that of a region 309*b* based on the number of folders to be displayed and the window size upon display. In this way, since the lower right window 300 in FIG. 3 also displays folders "folder2", "folder3", "folder4", and the like on an upper hierarchy, the operator can easily operate them.

In the first embodiment, when there are non-displayed subfolders due to restriction like in the lower right window 300 in FIG. 3, a previous list display button 307 and next list display button 308 are additionally displayed within the hierarchical structure 309*b*. In the neighborhood of the previous list display button 307 and next list display button 308, the numbers of non-displayed sub-holders held before and after the displayed subfolders are displayed.

In the example of the lower right window 300 in FIG. 3, "to previous list (0 folders)" is displayed next to the previous list display button 307 to indicate that the number of subfolders held before the foremost subfolder displayed at that time is "0". On the other hand, "to next list (9 folders)" is displayed next to the next list display button 308 to indicate that the number of subfolders held after the last subfolders displayed at that time is "9".

The folder hierarchical structure generation processing according of the first embodiment will be described below using the example of FIG. 3.

When the operator presses the folder opening button 304 via the external input device on the upper window 300 in FIG. 3, the folder opening and closing module 203 acquires a list of subfolders from the folder hierarchical information storage unit 207 using the identifier of the folder as a key. The folder opening and closing module 203 calculates the number of subfolders that can be displayed without scrolling based on the number of subfolders and the height of the window 300, in collaboration with the number of folders restricting module 202.

Note that the minimum number of folders to be displayed for subfolders (three folders in the first embodiment) may be set in advance (predetermined). As for subfolders of the folder that has undergone the opening process (subfolders of the currently selected folder), the minimum number of folders to be displayed (e.g., four folders) for the current folder may be set in advance independently of the above minimum number of folders. In this embodiment, the minimum number of folders for the current folder is larger than the minimum number of folders, but they may be equal to each other.

That is, in this embodiment, the number of subfolders to be displayed is determined based on the window size and the number of folders so that folders on an upper hierarchy are displayed as much as possible. However, depending on the number of folders in the upper hierarchy, the calculated number of subfolders to be displayed becomes too small, resulting in poor viewability of the list of subfolders. Hence, in this embodiment, the minimum number of folders to be displayed for subfolders is set to display a list of subfolders equal to or larger than the minimum number of folders. That is, when it is impossible to restrict the number of folders to a value which does not require to display the scroll bar 306, only the minimum required subfolders are displayed at the same time. When a given folder is opened while a plurality of folders are opened, the display state of subfolders of folders other than the currently operated folder can be changed to restriction display using the minimum number of folders, and the currently operated folder can be subjected to restriction display to have the minimum number of folders to be displayed for the current folder (e.g., 4).

A practical example for displaying the previous and next lists of subfolders which cease to be displayed due to restriction display and the folder hierarchical structure generation method for displaying subfolders to have the minimum number of folders for the current folder will be described below with reference to FIG. 4. Note that the display contents of FIG. 4 are the same as those in FIG. 3.

Figure 4:
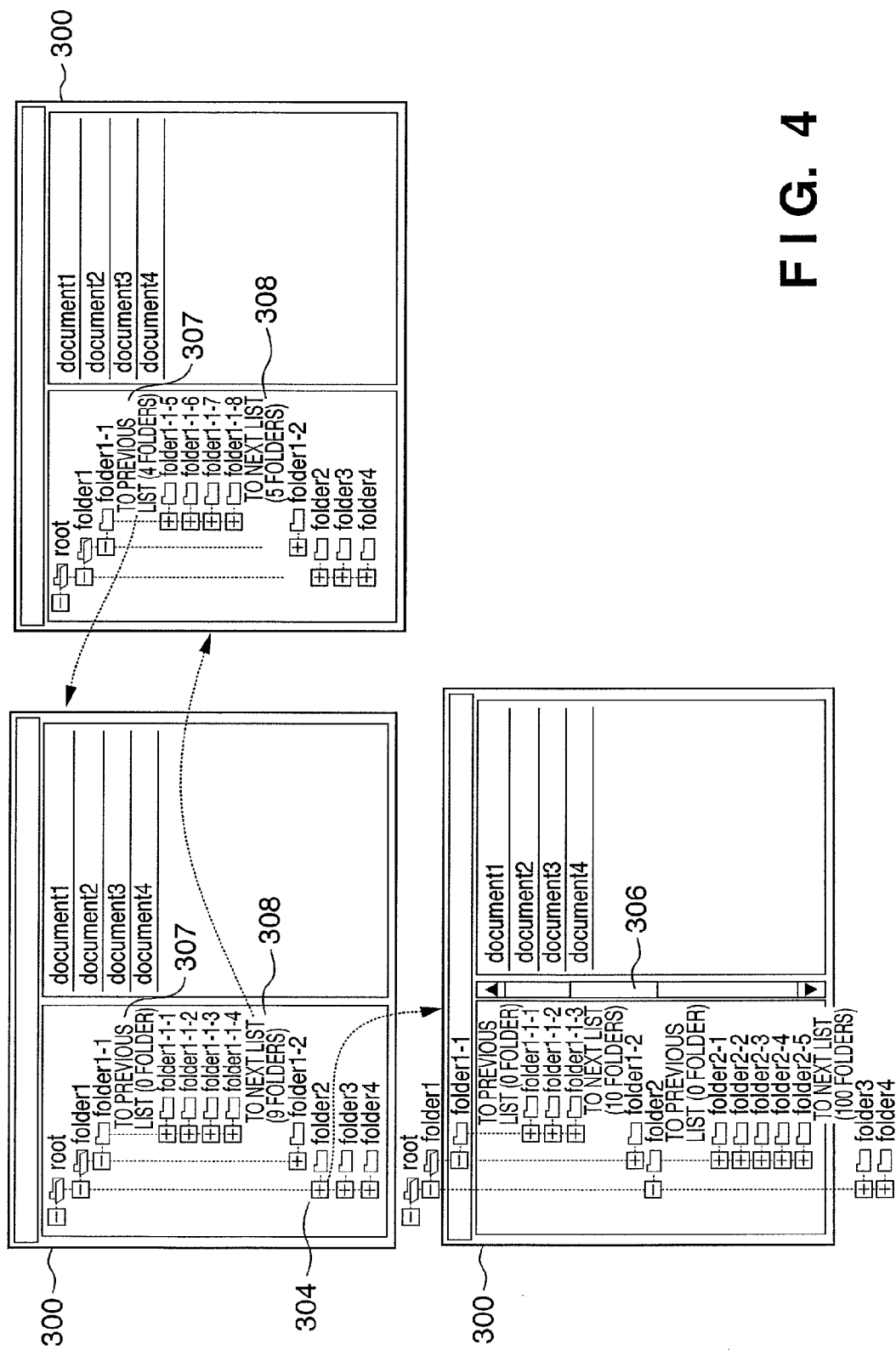
FIG. 4 is a view for explaining the folder hierarchical structure generation method according to the first embodiment of the present invention.

On the upper left window 300 in FIG. 4, the folder "folder1-1" is selected and opened, and first four subfolders "folder1-1-1" to "folder1-1-4" are displayed as those of the folder "folder1-1".

When the user presses the next list display button 308 on the upper left window 300 in FIG. 4, the fifth to eighth subfolders "folder1-1-5" to "folder1-1-8" are displayed as in an upper right window 300 in FIG. 4. When the user presses the previous list display button 307 on the upper right window in FIG. 4, the display state returns to that of the upper left window 300 in FIG. 4.

When the user presses the previous list button 307, the hierarchy display module 201 acquires information of subfolders to be displayed before information of the currently displayed subfolder from the folder hierarchical information storage unit 207 and folder information storage unit 206, and generates a folder hierarchical structure.

When the user presses the next list display button 308, the hierarchy display module 201 acquires information of subfolders to be displayed next to information of the currently displayed subfolders from the folder hierarchical information storage unit 207 and folder information storage unit 206, and generates a folder hierarchical structure.

Then, the hierarchy display module 201 newly calculates the numbers of subfolders before and after the currently displayed subfolders, and displays them together with the previous list display button 307 and next list display button 308.

In this way, the previous list display button 307 and next list display button 308 serve as transition instruction units, each of which transits the current display state to the display state of non-displayed subfolders before or after the displayed subfolders on the hierarchy of these subfolders.

The number of folders to be transited may be, for example, the minimum number of folders for the current folder or it may be transited one by one or by the predetermined number of folders with reference to the uppermost or lowermost subfolder of a displayed subfolder group on the same hierarchy.

For example, each time the user presses the previous list display button 307 or next list display button 308, the displayed folders may be transited to the previous or next folder one by one.

For example, when the user presses the folder opening button 304 of a folder "folder2" on a hierarchy different from the selected and opened folder "folder1-1" on the upper left window 300 in FIG. 4, a hierarchal structure on a lower window 300 in FIG. 4 is generated. Folders "folder3" and "folder4" and the like displayed outside the hierarchical structure display area 302 of the lower window 300 in FIG. 4 are illustrated for the sake of convenience, and they are not seen in practice.

On the lower window 300 in FIG. 4, the number of subfolders of the folder "folder1-1", which are displayed on the upper right window in FIG. 4, is changed to the minimum number of folders to be displayed (three folders in this case) so as to give a restriction display of these subfolders. Also, the display region (the number of subfolders to be displayed) of sub-holders of the newly opened folder "folder2" is calculated to fall within the height of the window 300. On the lower window 300 in FIG. 4, when the calculated number of subfolders of the folder "folder2" becomes smaller than the minimum number of folders to be displayed for the current folder (e.g., five folders), the number of subfolders of the folder "folder2" is set to be the minimum number of folders to be displayed for the current folder, so as to display these subfolders. At the same time, the user can adjust the display position of the scroll bar 306 to display all the subfolders of the currently selected folder "folder2".

The folder hierarchical structure generation processing of the first embodiment will be described below with reference to FIG. 5.

Figure 5:
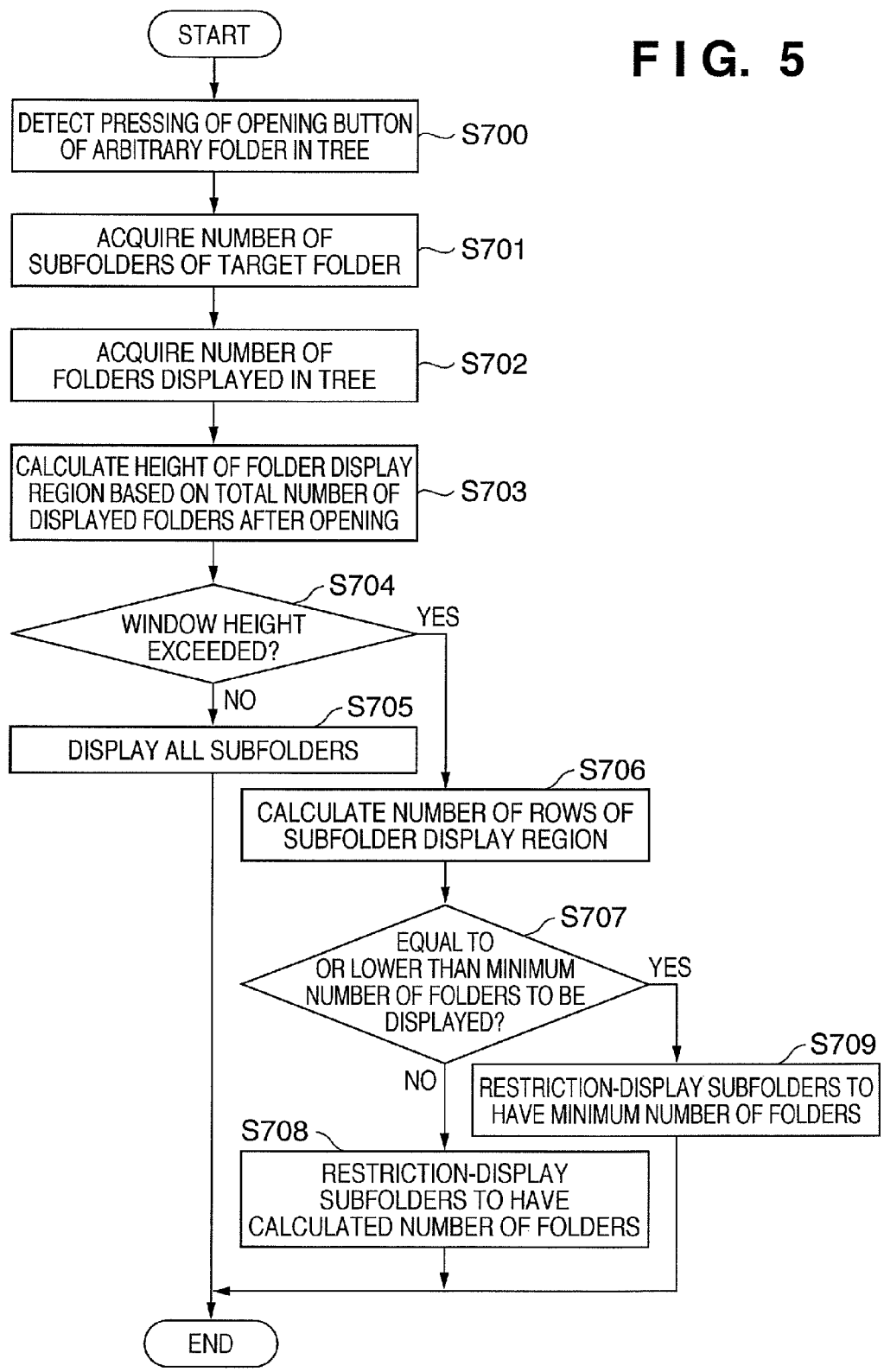
FIG. 5 is a flowchart showing the folder hierarchical structure generation processing according to the first embodiment of the present invention.

FIG. 5 is a flowchart showing the folder hierarchical structure generation processing according to the first embodiment of the present invention.

In step S700, the hierarchy display module 201 detects pressing of the folder opening button 304 of an arbitrary folder 305 displayed on the hierarchical structure display area 302 based on an operator's operation. With this detection, the hierarchy display module 201 instructs to expand the folder to be processed on the hierarchical structure display area 302.

In step S701, the hierarchy display module 201 acquires the number of subfolders of the selected folder to be processed from the folder information storage unit 206 and folder hierarchical information storage unit 207 of the information storage device 205. That is, the module 201 acquires the number of folders included on a hierarchy immediately before the opened folder.

In step S702, the hierarchy display module 201 acquires the total number of folders currently displayed on the hierarchical structure display area 302. That is, the module 201 acquires the number of folders to be displayed except for subfolders of the newly opened folder.

In step S703, the number of folders restricting module 202 calculates a total of the number of subfolders and the number of folders currently displayed on the hierarchical structure display area 302 acquired in steps S701 and S702, and calculates the height of the folder display region required to display all the folders based on that total (the total number of folders). For example, since a height required to display one row (the number of pixels required to display one folder) is determined according to the sizes of an icon and characters, the module 202 multiplies the total number of folders by that height, thus calculating the height required to display all the folders.

In step S704, the number of folders restricting module 202 compares the height of the window (display screen) 300 with the required height of the folder display region. If the height of the folder display region does not exceed that of the window (NO in step S704), the process advances to step S705. On the other hand, if the height of the folder display region exceeds that of the window (YES in step S704), the process advances to step S706.

In step S705, the hierarchy display module 201 displays all the subfolders of the selected folder on the hierarchical structure display area 302.

In step S706, the number of folders restricting module 202 calculates an excess of the height of the folder display region with respect to that of the window 300. Then, the module 202 calculates the number of rows of a display region of subfolders (the number of folders of subfolders to be displayed), which allows the currently displayed subfolders and subfolders of the opened folder to fall within window, based on the height of the excess and the number of subfolders. For example, the module 202 can calculate the number of rows using:

(Number of rows of subfolder display region)=(number of subfolders)−{(height of excess)/(height required to display one row)}−(two rows required to display the transition instruction units)

The number of folders restricting module 202 checks in step S707 if the number of folders calculated in step S706 is equal to or smaller than the minimum number of folders to be displayed (e.g., 3). If the number of folders is larger than the minimum number of folders to be displayed (NO in step S707), the process advances to step S708, and the number of folders restricting module 202 sets the number of rows of the subfolder display region to be the value calculated in step S706, thus displaying the folders.

On the other hand, if the number of folders is equal to or smaller than the minimum number of folders to be displayed (YES in step S707), the process advances to step S709, and the number of folders restricting module 202 sets the number of rows of the subfolder display region to be the minimum number of folders to be displayed, thus displaying the folders.

In this manner, if the process reaches step S705 or S708, since all the folder on the upper hierarchy are displayed, the user can easily recognize the whole hierarchical structure. On the other hand, if the process reaches step S709, although not all folders on the upper hierarchy are displayed, the display region of subfolders can be prevented from becoming too small to operate the subfolders themselves.

As described above, according to the first embodiment, upon displaying folder hierarchies having many folders as subfolders, the number of subfolders to be displayed is restricted based on the number of subfolders and the size of the window (display screen). In this way, the user can recognize the whole hierarchical structure, and the hierarchical structure can be flexibly displayed according to the size of the display screen.

Second Embodiment

Since the second embodiment has the same arrangements as those in FIGS. 1 and 2, a detailed description thereof will not be repeated, and differences from the first embodiment will be explained.

Figure 6:
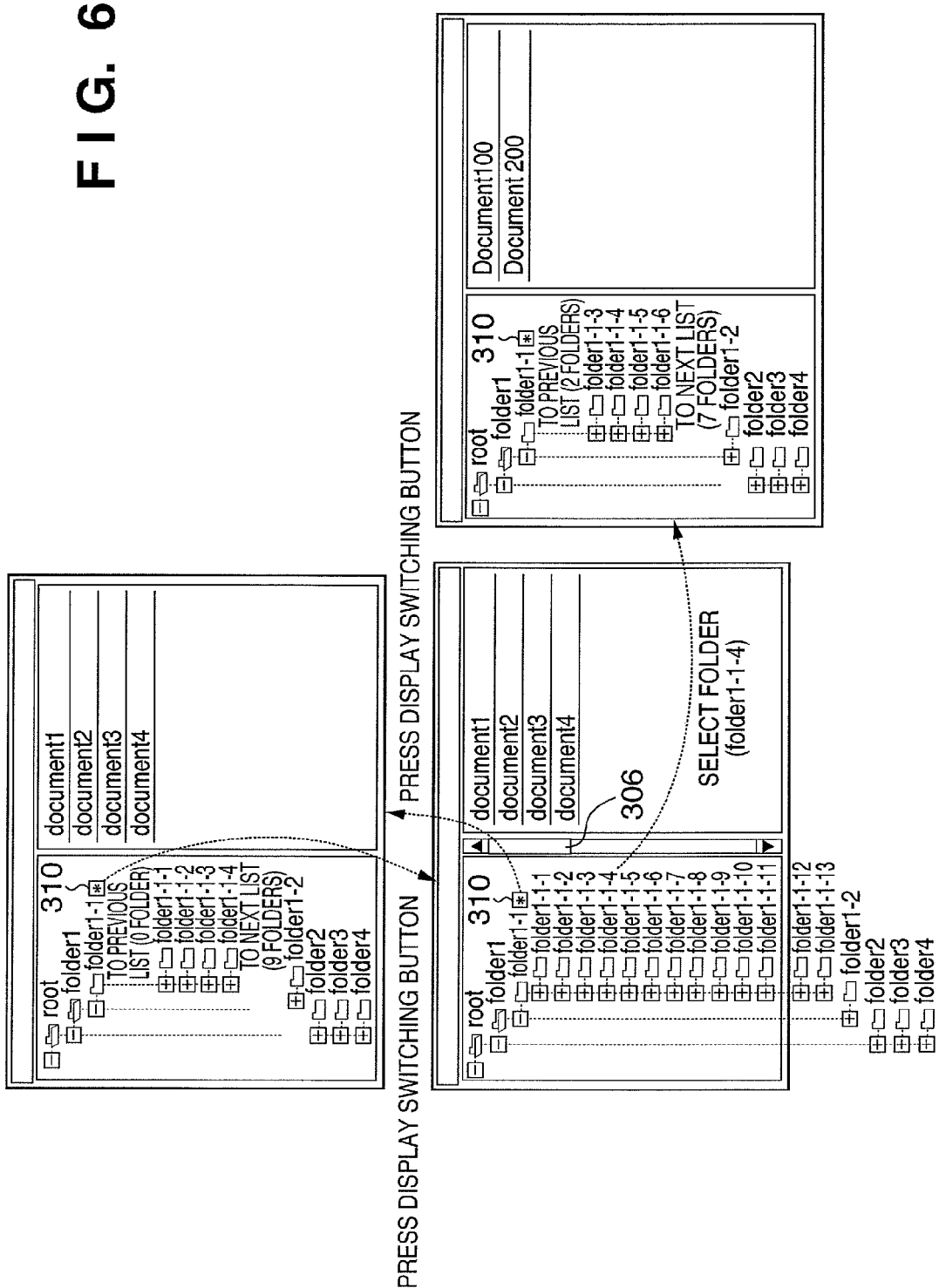
FIG. 6 is a view for explaining a folder hierarchical structure generation method according to the second embodiment of the present invention.

FIG. 6 is a view for explaining a folder hierarchical structure generation method according to the second embodiment of the present invention.

An upper window 300 in FIG. 6 has the same state as in the upper window 300 in FIG. 3, that is, a folder "folder1-1" is selected and opened. The difference from FIG. 3 is that a hierarchical structure is generated by providing a display switching button 310 used to switch a restricted display state and normal display state to the restriction-displayed folder "folder1-1".

When the user presses the display switching button 310 on the upper window 300 in FIG. 6, all subfolders of the folder "folder1-1" are displayed, as shown in a lower left window 300 in FIG. 6. At the same time, the display switching button is also provided to the normal display state. For this reason, when the user presses the display switching button 310 on the lower left window 300 in FIG. 6, the display state returns to that of the upper window 300 in FIG. 6.

When the operator presses the display switching button on the upper or lower left window 300 in FIG. 6, the hierarchical display switching module 204 discriminates the current display state, and transfers the state to be displayed to the hierarchy display module 201. The hierarchy display module 201 re-generates the hierarchical structure based on the information acquired from the folder information storage unit 206 and folder hierarchical information storage unit 207 in accordance with the transferred display state.

The lower right window 300 in FIG. 6 is a screen example of restriction display of folders on one hierarchy when a subfolder is selected in the normal display state like on the lower left window 300 in FIG. 6.

Selecting a folder often follows an operation for a subfolder or file in that folder. In this case, the subfolders which are displayed in the normal state are switched to restriction display to improve the operability. In this case, since the user may want to copy or move a file to another folder on the same hierarchy, the display switching button 310 is allocated near the restriction-displayed folder, thus allowing the user to switch to the normal display state again.

Likewise, when, for example, there are many subfolders of a subfolder "folder1-5", if the user presses the folder opening button of the subfolder "folder1-5" on the lower left window 300 in FIG. 6, the number of folders on the same hierarchy is large, and the number of folder on a lower hierarchy also becomes large. In this case as well, the hierarchical structure generation method described in the first embodiment is applicable.

Subfolders (subfolder group on the same hierarchy) of folders (parent folders in this case) other than the currently opened folder undergo restriction display to have the minimum number of folders to be displayed. Furthermore, as for the currently opened folder, its subfolders are switched to restriction display to have the minimum number of folders to be displayed for the current folder, or they undergo restriction display to fall within the window 300. The user can use either of these restriction-display modes.

As described above, according to the second embodiment, since the restriction-display state and normal display state are switched according to an operator's request, a more flexible hierarchical structure can be displayed, in addition to the effects described in the first embodiment.

Third Embodiment

In the third embodiment, a hierarchical structure may be re-generated upon detection of an operation on the folder element display area 301 in place of an operation of the folder hierarchical structure.

Since the third embodiment has the same arrangements as those in FIGS. 1 and 2, a detailed description thereof will not be repeated, and differences from the first embodiment will be explained.

Figure 7:
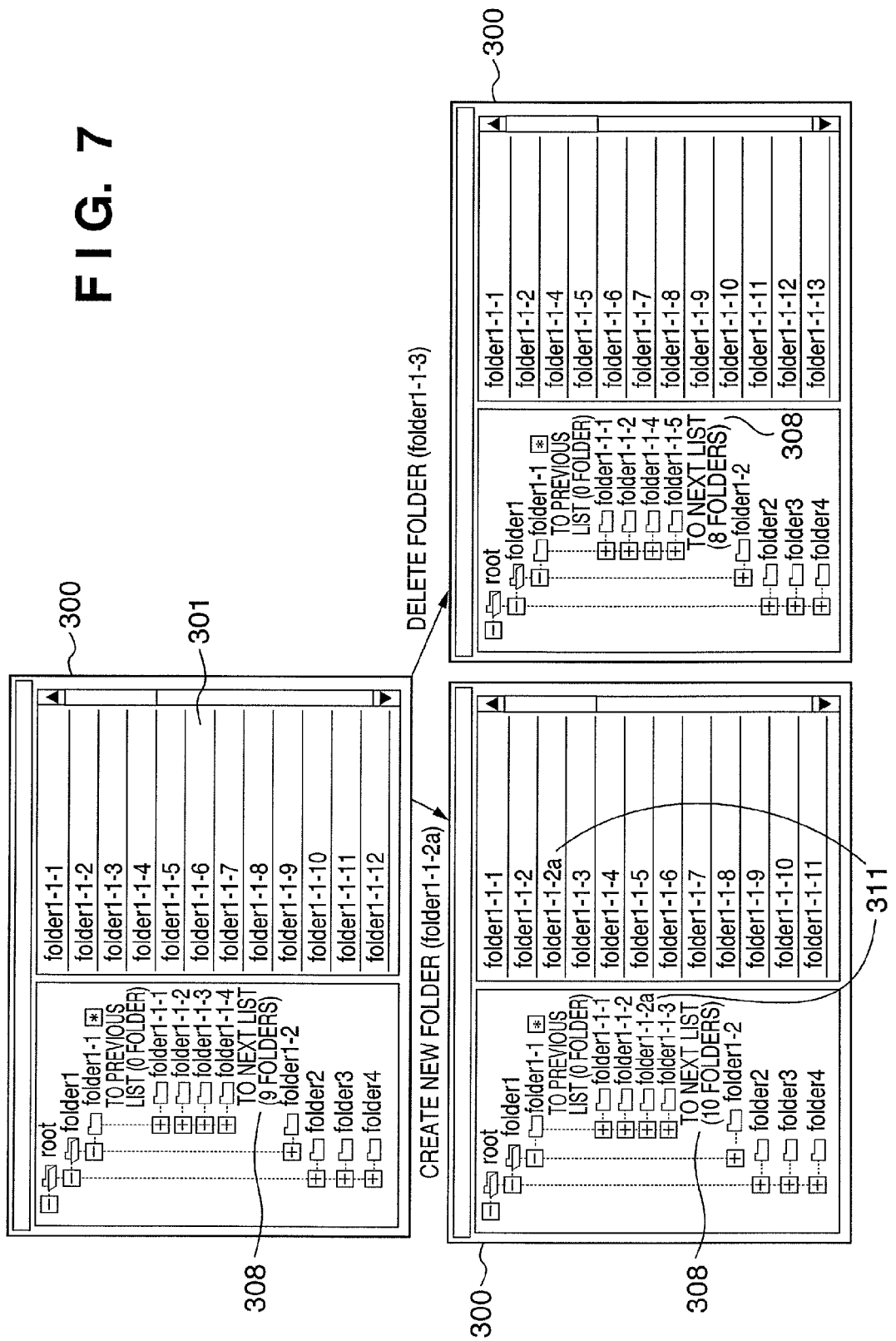
FIG. 7 is a view for explaining the folder hierarchical structure generation method according to the second embodiment of the present invention.

FIG. 7 is a view for explaining a folder hierarchical structure generation method according to the third embodiment of the present invention.

On an upper window 300 in FIG. 7, an arbitrary folder is selected, and the hierarchical structure is switched to restriction display. The folder element display area 301 displays subfolders in the selected folder. When the user creates a new folder 311 ("folder1-1-2a") for these folder elements, the hierarchical structure is re-generated like a lower left window 300 in FIG. 7.

When the user creates a new folder on the upper window 300 in FIG. 7, the hierarchy display module 201 acquires all pieces of folder information including the newly created folder from the folder information storage unit 206.

The hierarchy display module 201 checks if the new folder is included in the previous list, the currently displayed folder list, or the next list. The module 201 re-generates the hierarchical structure by updating the number of folders on the previous list display button, the currently displayed folder list, or the number of folders on the next list display button according to the checking result.

In case of the lower left window 300 in FIG. 7, since the new folder "folder1-1-2a" is created, the number of folders on the next list display button 308 is updated from "to next list (9 folders)" in the state of the upper window 300 in FIG. 7 to "to next list (10 folders)".

The same applies to a case wherein a folder is deleted (a lower right window 300 in FIG. 7) or a folder is copied or moved. In case of the lower right window 300 in FIG. 7, since a folder "folder1-1-3" is deleted, the number of folders on the next list display button 308 is updated from "to next list (9 folders)" in the state of the upper window 300 in FIG. 7 to "to next list (8 folders)".

As described above, according to the third embodiment, a folder hierarchical structure can be flexibly generated even when the structure is changed by an operation other than the folder hierarchical structure, in addition to the effects described in the first embodiment.

Note that all of the above embodiments have exemplified the folder hierarchical structure display method in software which is used as a standalone. However, the present invention is not limited to this. For example, the aforementioned folder hierarchical structure display method can also be applied to a server-client type application and a Web-based application using a WWW browser.

Also, the aforementioned method can be applied to a Web-based application that does not allow any drag-and-drop operations, and an application which displays a folder hierarchical structure to allow the user to operate files and folders in a device (touch panel or the like) which does not have a mouse as an input device.

As described above, according to the present invention, upon displaying a hierarchical structure in which a large number of data exist on one hierarchy, the number of folders to be displayed at the same time can be reduced. Upon expanding a folder, since the number of folders on its lower hierarchy is dynamically restricted, the entire hierarchical structure can be displayed, and the operability can be flexibly improved according to the number of data.

Furthermore, the operability upon folder operations such as copy, move, and the like can be improved. Moreover, since the total number of display items is restricted, the load on a server can be reduced, and the response can be enhanced when the method of the present invention runs on the server.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Example of storage media that can be used for supplying the program are a Floppy® disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2006-335077 filed on Dec. 12, 2006 and No. 2007-298598 filed on Nov. 16, 2007, which are hereby incorporated by reference herein in their entirety.

What is claimed is:

1. An information processing apparatus which performs display control of a plurality of folders using a hierarchical structure, comprising:
   a folder opening unit for opening one of the plurality of folders included in the hierarchical structure displayed on a display screen;
   a determining unit for determining the number of folders to be displayed on a lower hierarchy of the folder opened by said folder opening unit, based on the number of the currently displayed folders on the display screen, the number of folders included in the lower hierarchy of the folder opened by said folder opening unit, and a height of a window on which the plurality of folders are displayed; and
   a hierarchical display unit for displaying the folders on the lower hierarchy in accordance with the number of folders to be displayed determined by said determining unit; and
   a transition instruction unit for transitioning some of the folders on the lower hierarchy to a display state of currently non-displayed folders on the lower hierarchy, the transition instruction unit also being for displaying, within the displayed lower hierarchy, a previous list display button, a next list display button, or both,
   wherein, in response to the previous display button or the next list display button being activated, the transition instruction unit is for transitioning at least some of the currently non- displayed folders in the lower hierarchy to a displayed state, and at least some of the displayed folders in the lower hierarchy to the non-displayed state,
   wherein the previous list display button, if displayed, is displayed in a manner preceding all of the displayed folders in the lower hierarchy,
   wherein the next list display button, if displayed, is displayed in a manner succeeding all of the displayed folders in the lower hierarchy, and
   wherein said units are implemented at least in part by a processor of the information processing apparatus.

2. The apparatus according to claim 1, further comprising a number of folders display unit for displaying the number of currently non-displayed folders as part of the previous list display button or the next list display button.

3. The apparatus according to claim 1, wherein said determining unit compares a total of the number of currently displayed folders and the number of folders included in the lower hierarchy of the folder opened by said folder opening unit with the height of the window to check if a display of the currently displayed folders and the folders included in the lower hierarchy of the folder opened by said folder opening unit falls within the window, and
   when said determining unit decides that the display does not fall within the window, said determining unit determines to restrict the number of folders to be displayed on the lower hierarchy of the folder opened by said folder opening unit.

4. The apparatus according to claim 1, wherein when the number of folders calculated based on the number of currently displayed folders, the number of folders included in the lower hierarchy of the folder opened by said folder opening unit, and the height of the window is not more than the predetermined minimum number of folders, said determining unit determines the predetermined minimum number of folders as the number of folders to be displayed on the lower hierarchy of the folder opened by said folder opening unit.

5. The apparatus according to claim 1, further comprising display switching unit for instructing to switch a hierarchy display state in which the number of folders to be displayed is restricted by said hierarchical display unit, and a normal display state in which the number of folders to be displayed is not restricted by said hierarchical display unit.

6. The apparatus according to claim 1, wherein when a hierarchy different from the lower hierarchy, in which the number of folders to be displayed is restricted by said hierarchical display unit is opened, said determining unit changes the number of folders to be displayed on the restricted hierarchy to the predetermined minimum number of folders.

7. The apparatus according to claim 5, wherein when an arbitrary folder in a folder on a hierarchy, which is displayed in the normal display state, is selected, said hierarchical display unit displays folders on the hierarchy to have the number of folders to be displayed determined by said determining unit.

8. The apparatus according to claim 2, wherein said number of folders display unit updates the number of non-displayed folders based on an operation for a hierarchy of folders currently displayed by said hierarchical display unit.

9. A method of controlling an information processing apparatus which performs display control of a plurality of folders using a hierarchical structure, said method comprising:
   a folder opening step of opening one of the plurality of folders included in the hierarchical structure displayed on a display screen;
   a determining step of determining the number of folders to be displayed on a lower hierarchy of the folder opened in said folder opening step, based on the number of the currently displayed folders on the display screen, the number of folders included in the lower hierarchy of the folder opened in the folder opening step, and a height of a window on which the plurality of folders are displayed;
   a hierarchical display step of displaying the folders on the lower hierarchy in accordance with the number of folders to be displayed determined in the determining step; and
   a transition instruction step of transitioning some of the folders on the lower hierarchy to a display state of currently non-displayed folders on the lower hierarchy, the transition instruction step also displaying, within the displayed lower hierarchy, a previous list display button, a next list display button, or both,
   wherein, in response to the previous display button or the next list display button being activated, the transition instruction step transitions at least some of the currently non-displayed folders in the lower hierarchy to a displayed state, and at least some of the displayed folders in the lower hierarchy to the non-displayed state,
   wherein the previous list display button, if displayed, is displayed in a manner preceding all of the displayed folders in the lower hierarchy, and
   wherein the next list display button, if displayed, is displayed in a manner succeeding all of the displayed folders in the lower hierarchy.

10. A non-transitory computer-readable medium storing a program executed by a computer to control an information processing apparatus which performs display control of a plurality of folders using a hierarchical structure, said program comprising instructions for:

a folder opening step of opening one of the plurality of folders included in the hierarchical structure displayed on a display screen;

a determining step of determining the number of folders to be displayed on a lower hierarchy of the folder opened in said folder opening step, based on the number of the currently displayed folders on the display screen, the number of folders included in the lower hierarchy of the folder opened in the folder opening step, and a height of a window on which the plurality of folders are displayed;

a hierarchical display step of displaying the folders on the lower hierarchy in accordance with the number of folders to be displayed determined in the determining step; and a transition instruction step of transitioning some of the folders on the lower hierarchy to a display state of currently non-displayed folders on the lower hierarchy, the transition instruction step also displaying, within the displayed lower hierarchy, a previous list display button, a next list display button, or both, wherein, in response to the previous display button or the next list display button being activated, the transition instruction step transitions at least some of the currently non-displayed folders in the lower hierarchy to a displayed state, and at least some of the displayed folders in the lower hierarchy to the non-displayed state, wherein the previous list display button, if displayed, is displayed in a manner preceding all of the displayed folders in the lower hierarchy, and wherein the next list display button, if displayed, is displayed in a manner succeeding all of the displayed folders in the lower hierarchy.

* * * * *